Dec. 6, 1960 R. NEELY 2,962,944
BOX-MAKING MACHINE
Filed Dec. 4, 1958 7 Sheets-Sheet 1

INVENTOR
RODGERS NEELY
BY Scrivener & Parker
ATTORNEYS

Dec. 6, 1960     R. NEELY     2,962,944
BOX-MAKING MACHINE

Filed Dec. 4, 1958     7 Sheets-Sheet 2

Fig. 7

INVENTOR
RODGERS NEELY

BY Scrivener & Parker
ATTORNEYS

Dec. 6, 1960  R. NEELY  2,962,944
BOX-MAKING MACHINE
Filed Dec. 4, 1958  7 Sheets-Sheet 4

INVENTOR
RODGERS NEELY

BY Scrivener & Parker
ATTORNEYS

Dec. 6, 1960 R. NEELY 2,962,944
BOX-MAKING MACHINE
Filed Dec. 4, 1958 7 Sheets-Sheet 5

INVENTOR
RODGERS NEELY

BY *Scrivener & Parker*

ATTORNEYS

Dec. 6, 1960

R. NEELY 2,962,944

BOX-MAKING MACHINE

Filed Dec. 4, 1958

INVENTOR
RODGERS NEELY

BY *Scrivener & Parker*

ATTORNEYS

United States Patent Office 2,962,944
Patented Dec. 6, 1960

2,962,944
BOX-MAKING MACHINE

Rodgers Neely, Metuchen, N.J., assignor to Alexander Ungar, Inc., New Brunswick, N.J., a corporation of New York Filed Dec. 4, 1958, Ser. No. 778,258

17 Claims. (Cl. 93—41)

This application is a continuation-in-part of my copending application Serial No. 704,057, filed December 20, 1957, for Box Making Machine, now abandoned.

This invention relates to the manufacture of boxes and, more particularly, has to do with the manufacture of boxes of the type which are adapted to contain cigars, and the invention will be described in this application in connection with the manufacture of a cigar box, although it will be understood that it is not limited in any way to the manufacture of boxes for cigars or any other specific articles or goods.

In the manufacture of cigar boxes the box part is manufactured and the lid is then attached to the upper edge of a side wall of the box by a hinge strip. In the use of such boxes it has been found that the bottom does not have to bear any considerable load and may therefore be formed of relatively thin material, such as a relatively thin paper board. The side and end walls, however, bear greater loads, which are principally due to movement during shipment, and must therefore be formed of material which is thicker than the material of the bottom.

In accordance with one present practise in the industry, cigar boxes are formed by cutting a cruciform blank from a single sheet of material which therefore has a uniform thickness equal to the required, relatively greater thickness of the side and end walls. Such manufacture is not only wasteful because of the unnecessary thickness of the bottom part, but is also wasteful because of the loss of corner parts resulting from the cutting of the unitary cruciform blank from a sheet of material, as will be more fully described and illustrated hereinafter.

In accordance with this known practise in the cigar box industry cigar boxes are made by cutting a cruciform blank from a sheet of paperboard, wood pulp board or the like and then forming in the upper, or inner surface of the cruciform box blank skives which separate the side wall and end wall parts from the bottom part, then setting up the side wall and end wall parts at right angles to the bottom, and then connecting and holding the parts permanently in set-up position by corner stays. The setting up and staying operations may be performed on commercially available machines, such as the Kingsbury and Davis machine. In this machine, as in all others to which the invention relates, a head having the size and shape of the inside of the finished box is forced downwardly against the bottom-forming part of the cruciform blank, causing the side and end wall forming parts to be forced upwardly about the skives into engagement with the side walls of the head, thus setting up the side walls and end walls at right angles to the bottom, after which outside corner stays are applied and the head is withdrawn from the box.

In United States Letters Patent No. 2,074,315, issued to me on March 16, 1937, I described and claimed a cigar box having its end walls and bottom formed of a single piece of relatively thin material, each end wall being formed of two thicknesses of the material folded about a score line to lie in face-to-face superposed relation, and the side walls being formed separately from the bottom and end walls blank and being connected to the set-up end walls to complete the box. It will be seen that a box constructed in this manner will cost much less to manufacture than a box made from a cruciform blank as described hereinbefore, as the bottom is made of relatively thin material and the end walls are relatively thick, as each of them is formed by two layers of the relatively thin material, while the side walls may be made of material of any suitable thickness as they are formed separately from the bottom and end walls blank. Further, the blank forming the bottom and end walls is not cruciform in shape and therefore may be cut from a sheet of material without waste due to the loss of corner cut-outs.

My present invention provides means for manufacturing a box having a construction described above and disclosed in the Letters Patent referred to and, more particularly, provides means for positioning the side walls in the position and relations to other box parts that they will occupy as parts of a finished box, then positioning the bottom and end walls blank with respect to the side walls, then setting up the end wall forming parts of the blank to their final positions with respect to the side walls and the bottom, and finally connecting the parts by applying corner stays to the side and end walls. The means provided by the invention may take the form of a modification of a setting up machine such as the Kingsbury and Davis machine, and are so described in this specification.

An embodiment of the invention is described in this specification and illustrated in the accompanying drawings, in which.

Figure 1:
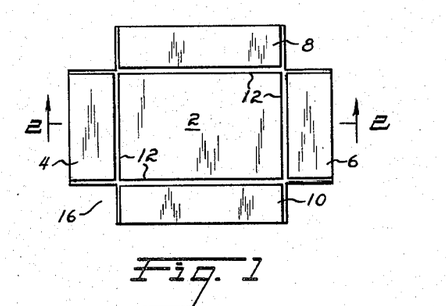
Fig. 1 is a plan view of a box blank of the construction now widely used.
Figure 2:
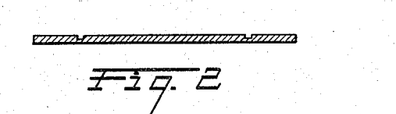
Fig. 2 is a cross sectional view taken on line 2—2 of Fig. 1.
Figure 3:
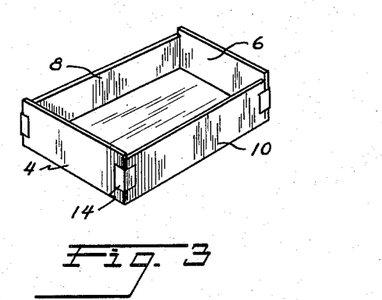
Fig. 3 is a perspective view showing the blank of Figs. 1 and 2 in set-up condition.

In Figs. 1 and 2 of the drawings there is shown a box blank of the type and construction now widely used in making cigar boxes. This blank comprises a cruciform shaped, unitary piece of paperboard, wood pulp board or similar material having a central, rectangular, bottom-forming part 2, and wall forming parts 4, 6 and side wall forming parts 8, 10. Skives 12 are formed in the upper surface of the blank along the boundaries between the bottom part 2 and the wall parts 4, 6, 8, 10 and provide hinge means permitting the side and end wall parts to be set up at right angles to the bottom part as shown in Fig. 3, after which outside corner stays 14 may be applied to hold the parts in set up condition. The side and end wall parts 4, 6, 8, 10 must be thicker than the bottom part 2 in order to provide the requisite greater strength and, as the bottom and wall parts are formed from a single sheet of material, the bottom is thicker than is necessary, with consequent waste of material. Additional waste is caused by the loss of four corner pieces, as at 16, when the cruciform blank is cut from a sheet of material.

Figure 4:
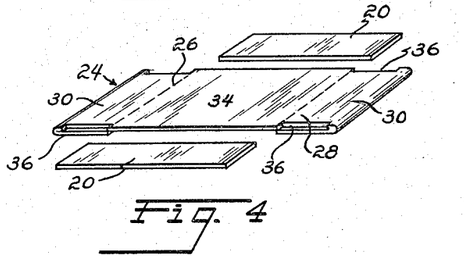
Fig. 4 is a perspective view of the side walls and the bottom and end walls forming blank used in making a box in accordance with this invention.
Figure 5:
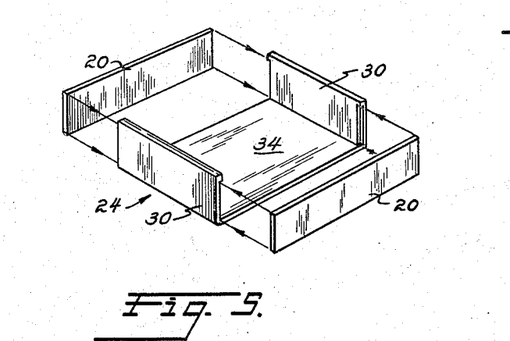
Fig. 5 is a perspective view showing diagrammatically the making of a box by the means provided by this invention.
Figure 6:
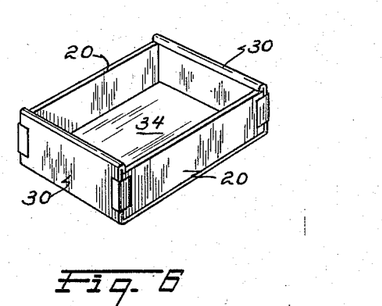
Fig. 6 is a perspective view of a box formed by the means provided by this invention.
Figure 7:
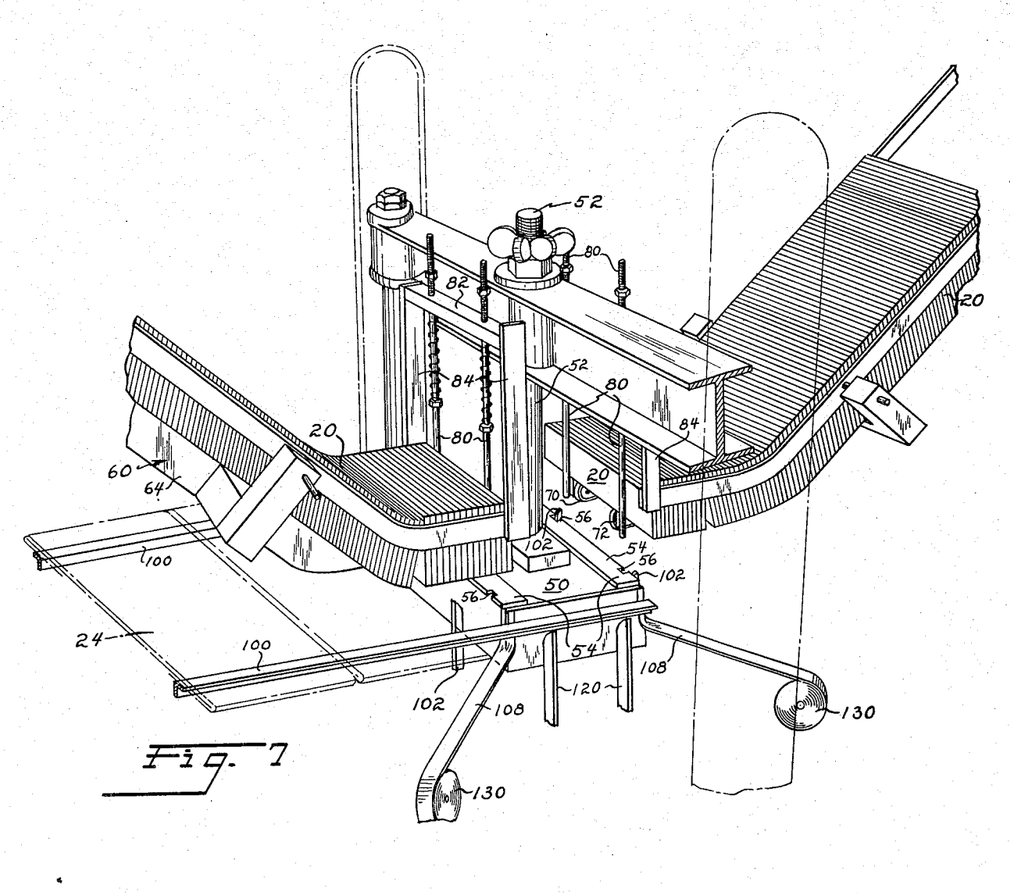
Fig. 7 is a perspective view of box making apparatus according to the invention.

In my Letters Patent referred to above, and in Figs. 4, 5 and 6 of the drawings forming part of this specification, there are disclosed the parts of a cigar box having wall parts of the requisite relatively great thickness and a bottom part formed of relatively thin material. These parts consist of two side wall forming parts 20 and a bottom and end wall forming blank 24.

The blank 24, from which the bottom and end walls of a box are formed, may be made of paperboard, woodpulp board or any other suitable material. The blank 24 is generally rectangular in shape and is laterally scored on its lower or outer face to provide hinges 26, 28 about which double thickness end pieces 30 may be bent upwardly from the bottom-forming part 34. A recess 36 is cut in both lateral side edge parts of the inner member of each double-thickness end piece and each of these recesses is intended and adapted to receive an end of one of the side wall members 20. Each of these recesses is rectangular in shape and its width is equal to the desired thickness of one of the side wall members 20, and its length is equal to the desired height of the side wall member, which is less than the height of the end wall members, as shown in Fig. 6. Each recess preferably extends in one direction to the adjacent one of the score lines 26, 28, which provides the hinges between the end parts 30, 32 and the bottom part 34, and in the other direction nearly to the upper or outer end edge of the inner member of each end part 30.

In the manufacture of a box in accordance with the present invention the two side wall parts 20 are placed in the positions they will occupy in the finished box and are then brought into position adjacent the bottom and end walls forming blank, the end wall parts of the blank are then set up into finished relation to the side wall parts, and corner stays are finally applied to permanently hold the box parts together and in set-up condition.

New and improved means are provided by this invention for making a box from the blank 24 and side wall parts 20 and such means are disclosed in Figs. 7 to 15 as part of a box making machine, certain well known elements and parts of which has been omitted from the drawings and from this specification as they are conventional and well known. It may be pointed out, however, that the embodiment of the invention disclosed in this application may be provided as a modification of a Kingsbury and Davis setting up machine such as that disclosed in United States Letters Patent No. 728,086.

Figure 8:
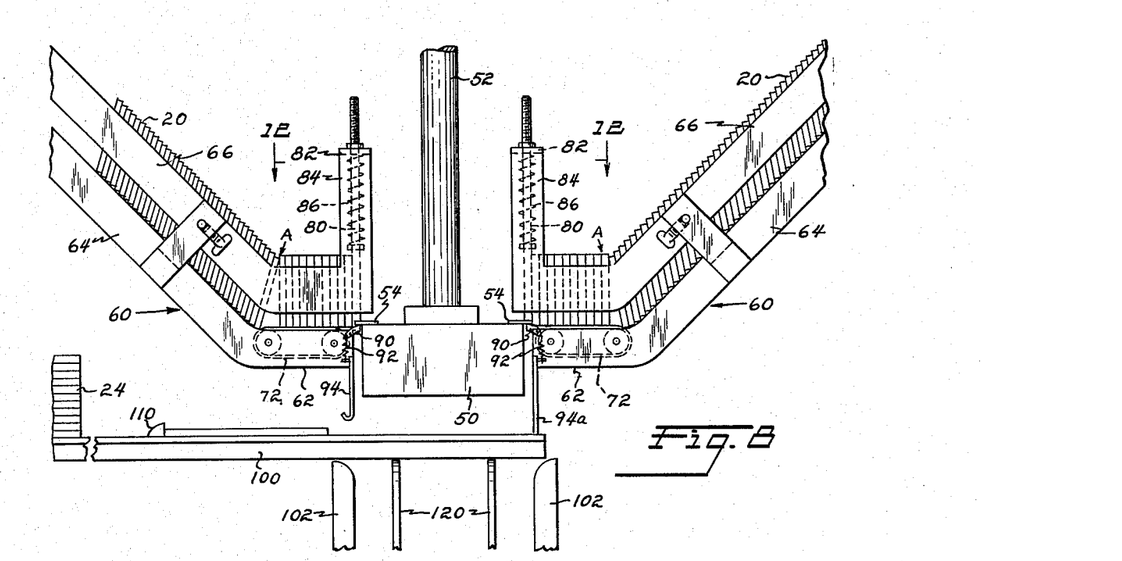
Figs. 8 to 11 are end views of the box making means provided by this invention, such means being shown in successive stages of operation.
Figure 9:
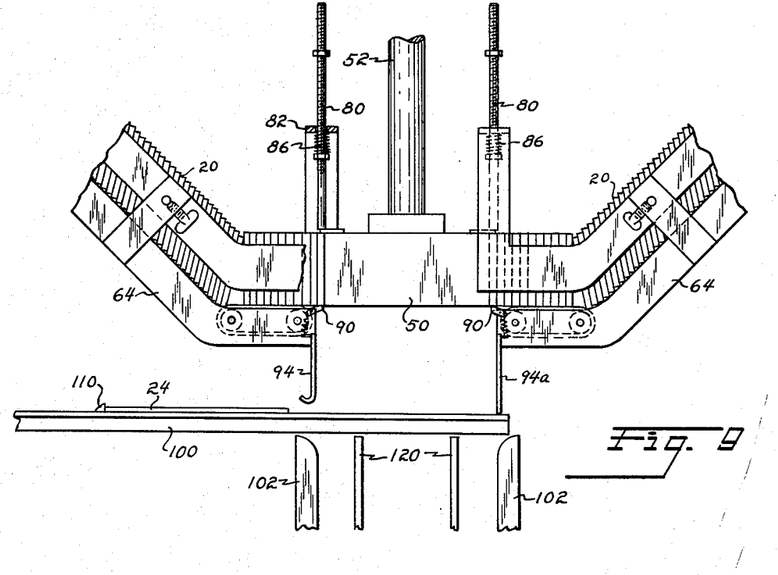
Figure 10:
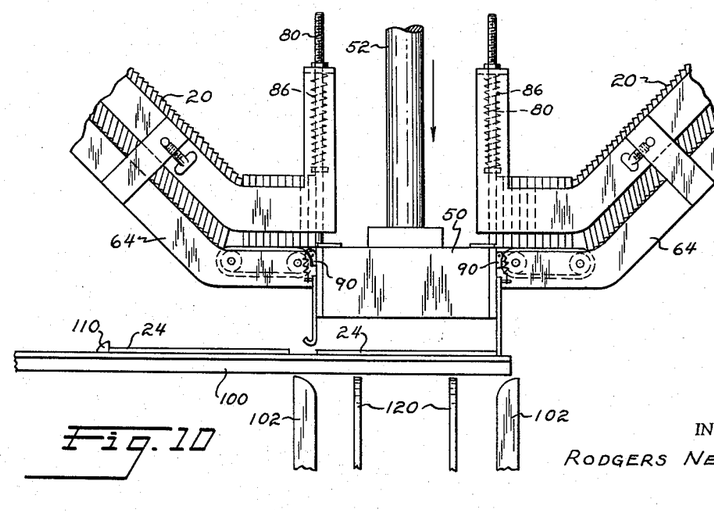
Figure 11:
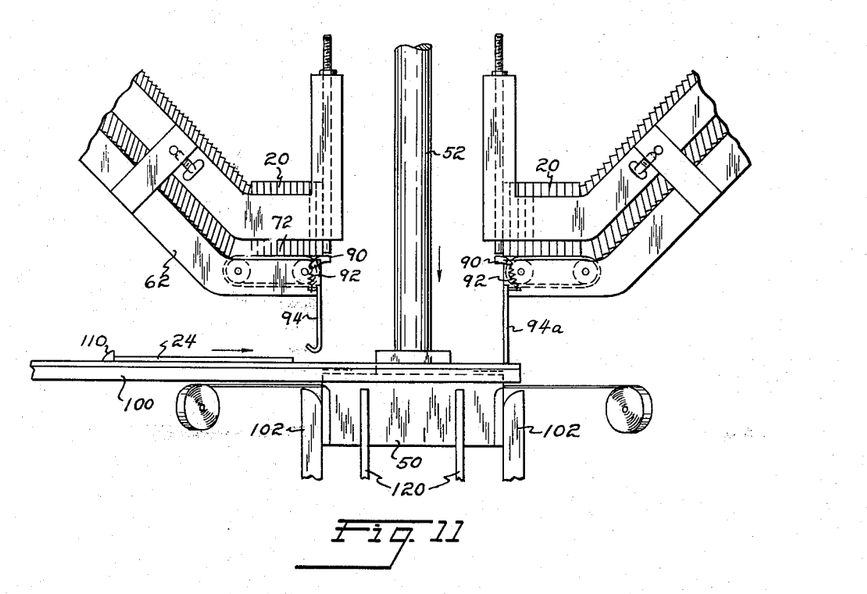
Figure 12:
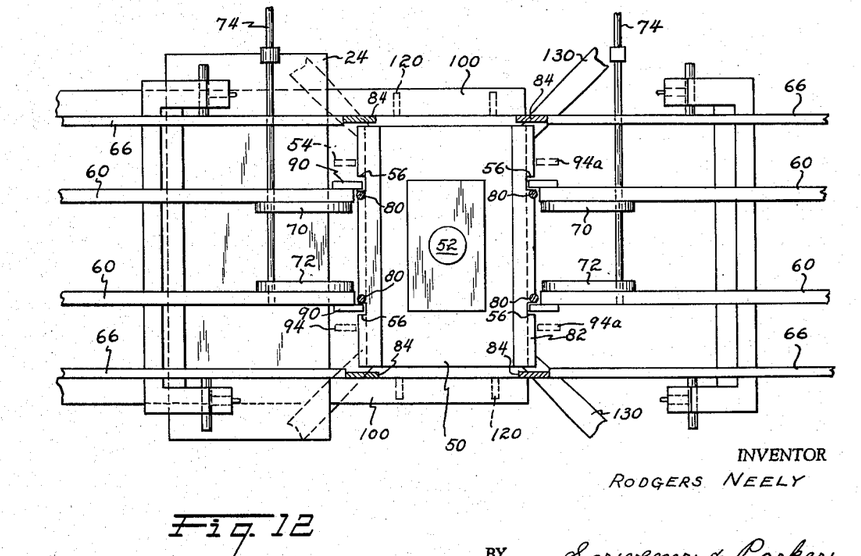
Fig. 12 is a partly elevational and partly sectional view taken on line 12—12 of Fig. 8.

The box making means provided by the invention and disclosed in this specification comprises a head 50 which is supported on the lower end of a rod 52, which is mounted for vertical reciprocating movement between a lower position, which is shown in Fig. 11, and an upper position, which is shown in Fig. 9. The head 50 has side and end walls and a lower face, which respectively correspond in size, position and relation to the inner surfaces of the side and end walls and the bottom of the box which is to be manufactured from the blank 24 and the side wall forming parts 20. The head is preferably formed as a parallelopiped for the manufacture of cigar boxes and has a flat upper surface. Two metal strips 54 are attached to its upper surface and extend along the opposite longitudinal side edges of the head and each overhangs the adjacent side wall of the head, as clearly shown in Figs. 8 to 11. Each plate has two spaced openings 56 in its outer edge, for a purpose to be described hereinafter.

Means are provided by the invention for supplying side wall members 20 to positions adjacent each side wall of the head 50 and, at the proper time in the cycle of operation of the machine, which is when the head is in its upper position, for moving a side wall member into face-to-face abutting engagement with each side wall of the head. Such means comprise, first, means for supporting the side wall members on their bottom edges in a horizontal stack and for guiding them to their final positions adjacent the head, and means associated with the supporting and guiding means for moving the side wall members into positions on the side walls of the head. The supporting and guiding means comprise two parallel tracks 60 at each side of the head which extend in a direction toward the head and at right angles to the side walls thereof and which support a horizontal stack of side wall members on each side of the head. Each pair of tracks has a horizontal part 62 which is located adjacent the head 50 and the inner end of which is spaced from the side wall of the head by a distance equal to or greater than the thickness of one side wall member. Each pair of tracks also has an upwardly inclined, outer part 64 which forms a continuation of the horizontal part 62 in a direction away from the head. Side wall members 20 are supplied to the upwardly inclined part 64 of the tracks and are fed by gravity to the horizontal part 62 and are moved along that part to the head. Side members 66 are connected to each pair of tracks and provide means for engaging the ends of the side wall members and guiding them.

Means are provided by the invention for moving the side wall members 20 at each side of the head along the horizontal parts 62 of the tracks 60 in a direction toward the head 50. The means at each side of the head comprise two endless chains 70, 72, trained about sprockets which are rotatably mounted on the horizontal parts 62 of the tracks 60 and which are driven by flexible shafts 74 in such a direction that the upper reach of each chain moves toward the head. One sprocket of each pair about which a chain is trained is mounted at the inner end of the horizontal track part 62 and the other sprocket of the same pair is mounted at the intersection of the horizontal and upwardly inclined parts 62, 64 of the tracks 60. The sprockets and chains are so mounted and are of such size that the upper surfaces of the upper reaches of the chains are slightly above the upper surfaces of the horizontal track parts 62 and therefore the side wall members moving from the inclined track parts to the horizontal track parts are engaged by, and supported on, the upper reaches of the chains and are constantly urged by them toward the head and are actually moved toward the head at pre-determined times in the cycle of operation of the machine, as will be described hereinafter.

The means which have been described for supporting the side wall members and feeding them to the head constitute an important part of the invention. It will be seen that side wall members may be easily and manually fed into the inclined track parts and will be moved along those parts by gravity. As each successive side wall member reaches the bottom of the inclined part 64 its bottom edge is engaged by the moving chain and it is flipped from its inclined position to a vertically upright position in face-to-face engagement with the last side wall member on the chains, as shown at A in Fig. 8, after which it will be urged and moved toward the head by the chains without the necessity of any other means or operation.

Means are provided by the invention for normally restraining the side wall members 20 from actual movement toward the head although, as described above, these members are constantly urged toward the head by the moving chains, and for permitting such movement at pre-determined times in the cycle of operation of the machine. The restraining means associated with each horizontal stack of edge-supported side wall members comprises two vertical rods 80, each of which is slidably mounted in the horizontal part 82 of a frame 84 of inverted U-shape. There are, of course, two such frames, one at each side of the head, and these may be attached to, or formed integrally with, the side members 66 of the tracks which support and guide the side wall members. The lower ends of these rods are above and in the path of vertical movement of the plates 54 which extend along the side edges of the upper surface of the head and as the head is reciprocated vertically the plates engage the lower ends of the rods and move them from a lower position, which is shown in Figs. 8, 10 and 11 to an upper position which is shown in Fig. 9. Each rod is constantly urged to its lower position by a compression spring 86 which is disposed between the cross-member 82 of the associated frame 84 and an abutment on the rod. In their lower position the rods are in the path of movement of the two stacks of side wall members 20 which are supported on the continuously moving chains and therefore restrain these members from movement toward the head. In the upper position of the rods, to which they are moved by the upward movement of the head 50 and plates 54, the rods are removed from the path of movement of the side wall members, which are then moved toward the head by the continuously moving chains.

As described hereinbefore, each side wall of the head 50 is spaced inwardly, or away from, the end of the adjacent horizontal track member 62 by a distance equal to or greater than the thickness of a side wall member, and this relation of parts is clearly shown in Fig. 8. It will be seen that when the head reaches its upper position, which is shown in Fig. 9, the restraining rods 80 will have been moved away from the stacks of side wall members and the moving chains 70, 72, will move the stacked side wall members toward the head, causing the end side wall member 20a to be moved into face-to-face abutting relation to the side wall of the head beneath the overhanging side plate 54.

Means are provided by the invention for holding the side wall members onto the head during its entire downward movement. Such means comprise, first, two levers 90 on each side of the head, each of which is pivotally mounted adjacent the upper edge and adjacent the inner end of one of the spaced track parts 62 on which the stacked side wall members rest. Each lever comprises an inner end part which is positioned in the path of movement of the adjacent side wall of the head, and an outer end part to which is attached one end of a spring 92, which constantly urges the inner end of the lever upwardly against a stop to a position just below and outside the bottom of the head when the head is in its upper position. It will be seen that there are four of these levers 90, two being positioned on each side of the head. The second means for holding the side wall members 20 in contact with the head during the downward movement thereof are fixed vertical rails 94, 94a, one of which is attached to the inner end of each of the spaced track parts 62, there being four of these vertical rails in all, two being at each side of the head. The inner surface of each of these rails is spaced from the path of movement of the adjacent side wall of the head by a distance equal to the thickness of one of the side wall members 20. The upper end of each vertical rail 94 is just below one of the levers 90 and the lower end is just above the upper surface of a pair of horizontally spaced parallel rails 100 which extend from an outer part of the machine in a direction at right angles to the side walls of the head and which are provided for a purpose to be described hereinafter. Below the rails 100 there are provided four additional vertical rails 102 for holding the side wall members on the head during downward movement thereof, there being two of these rails at each side of the path of movement of the head. The inner surfaces of the rails 94, 94a and 102, 102a on each side of the head are in the same vertical plane, which is spaced from the plane of the adjacent side wall of the head by a distance equal to the thickness of one of the side wall members 20.

Figure 13:
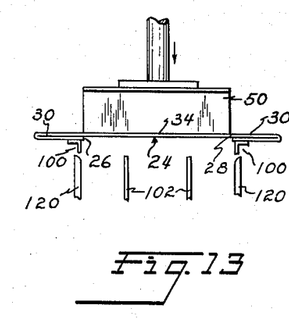
Figs. 13 to 15 are end views of parts of the box making apparatus, showing successive stages in setting up the end walls forming parts of the blank.
Figure 14:
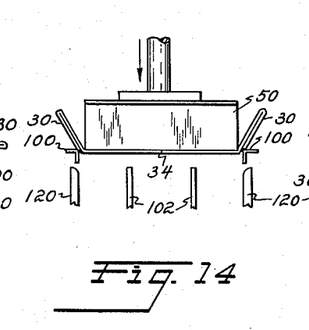
Figure 15:
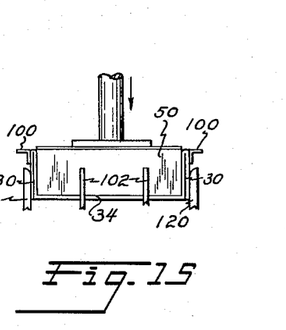

Means are provided by the invention for applying a bottom and end walls forming blank 24 to the head 50 during each cycle of operation of the machine, thereby to form a complete box with the side walls which are applied to the head. These means comprise principally the rails 100 which are referred to above. These rails extend from a pile of blanks 24, as shown in Fig. 8, toward and into the box-forming area of the machine in a direction at right angles to the side walls of the head. The rails are spaced sufficiently from the planes of movement of the end walls of the head to permit the head to pass between them, leaving equal spaces between each rail and the adjacent end wall of the head. The rails are also spaced apart by a distance which may be greater than the distance between the score lines 26, 28 of the blank 24 plus twice the thickness of one of the double-thickness end walls 30 of the blank. The end wall parts of a blank in box-forming position in the machine therefore rest on the rails 100 with the bottom-forming part 34 of the blank positioned between the rails and directly beneath and aligned with the lower surface of the head, as shown in Figs. 13, 14 and 15.

Below the rails 100 and extending to the lowermost position of movement of the head there are provided means for holding the end wall parts 30 in face-to-face abutting relation to the end walls of the head during downward movement of the head below the rails 100, and such means comprise the four vertical rails 120 which are positioned below the horizontal rails 100 and two of which are positioned adjacent each end of the head and all of which have inner surfaces spaced from the plane of movement of the adjacent end wall of the head by a distance equal to the thickness of the double-thickness end wall part 30 of the blank 24. It will be seen from Fig. 8 that the four vertical rails 102 and the four vertical rails 120 are positioned above and at the lowermost position of the head and provide means for holding the side wall members 20 and the end wall members 30 in box-formed position on the head after the head leaves the rails 100 in its downward movement and when it arrives at its lowermost position.

Means are provided by the invention for moving blanks 24 from a pile of such blanks to box-forming position on the rails 100 below the head 50. Such means comprise mechanical means 110 of known and conventional structure and operation for moving the lowermost blank from the pile along the rails 100 to the box-forming position where the blank is stopped by engagement with the lower ends of the vertical rails 94a which are on the far side of the box-forming position, as shown in Figs. 8 to 11. The vertical rails 94 on the near side of the box-forming position terminate at their lower ends above the rails 100 and preferably have forwardly curved lower ends, forming J-shaped rails, which prevent any snagging of the blanks by the lower end of the rails 94 as the blanks pass under them.

At the lowest position of the head, which is shown in Fig. 11, there are provided means for applying adhesive, thermoplastic or other stays to the four corners of the box in order to permanently connect the side wall members 20 to the set-up end wall members 30. These corner staying means are conventional per se and their construction and operation is not part of this invention, as such means are provided on commercially available machines, such as the Kingsbury and Davis machine, and are described in Letters Patent No. 728,086 which is referred to above. These corner staying means comprise a roll 130 of adhesive, thermoplastic or other strip material and an anvil (not shown) positioned adjacent each of the four corners of the head, each anvil being operative, when the head 50 is in its lowermost position with the box parts thereon, to press the strip against a corner of the box after cutting it from the roll, leaving a length of the strip attached at each corner of the box and connecting the side wall member and the end wall member.

The operation of the means provided by the invention will now be described and it will be understood that the head 50 is being reciprocated vertically between its upper and lower positions by the rod 52, and the described cycle of operations will begin with the head being moved upwardly and having arrived at the position shown in Fig. 8, in which it is approaching its uppermost position between the horizontal piles of side members 20 but has not yet arrived there. The head is, however, above the rails 100. In this position of the parts the piled side wall members 20 are urged toward the head by the continuous movement of the upper reaches of the endless chains 72 on which the side wall members rest, but are prevented by the lower end parts of the vertical rods 80 from moving toward the head.

As the head moves to its uppermost position, which is shown in Fig. 9, the metal strips or plates 54, which are on the upper surface of the head, engage the lower ends of the vertical rods 80 and move them upwardly against the force of springs 86 until the head reaches its uppermost position between the horizontal piles of side wall members 20. When the head reaches this position the rods 80 will have been pushed upwardly to a position above and removed from the piles of side wall members and the movement of the upper reaches of the endless chains 72 will cause the piles to move toward the head, thus bringing the outermost side wall member 20a of each pile into face-to-face abutting relation to the adjacent side wall of the head beneath the metal edge plates 54 which are on the head.

While the head is reaching this upper position and receiving a side wall member, a blank 24 is moved by the mechanical means 110 from the pile of blanks shown in Fig. 8 along the rails 100 until it engages and is stopped by the lower ends of the vertical rails 94a, in which position the central, bottom-forming part 34 of the blank is directly below the head 50 and the end-forming parts 30 of the blank rest on the rails 100 as described above.

The head now begins its downward movement and the overhanging edges of plates 54 on head 50 engage the upper edges of the two side wall members 20a which have been moved into face-to-face abutting relation to the side walls of the head, thus carrying these two side wall members with the head as it moves downwardly. The lower edge of each of the two side wall members being carried down with the head first engages the upper surface of the outer end of the two levers 90 on one side of the head and all of the levers 90 are rocked about their pivotal supports by further downward movement of the head and side wall members, as shown in Fig. 10, thus permitting the side wall members on the head to pass the levers. The upward pressure exerted by the levers on the bottom edges of the side wall members on the head is sufficient, however, to support the side wall members on the head and to prevent them from falling from the head until they reach the vertical rails 94, 94a and 102 which engage their outer surfaces and hold them firmly to the side walls of the head during the remainder of the downward movement of the head.

As illustrated in Figs. 13, 14 and 15, the bottom of the descending head 50 will engage the bottom-forming part 34 of a blank 24 which is in the described box-forming position on rails 100 and will force the same downwardly while the end wall forming parts 30 of the blank are supported by the rails 100, thus causing the end wall parts to be folded upwardly about the score lines 26, 28 into face-to-face abutment with the end walls of the head as the head descends. As the end wall parts 30 of the blank move into this final position the recesses 36 therein receive the ends of the side wall members, thus bringing all parts of the box into final, assembled positions on the head, requiring only their connection to each other to complete the box.

The further downward movement of the head and the box parts assembled thereon brings the parts into engagement with the four vertical rails 102 and the four vertical rails 120. The rails 102 closely engage the outer surfaces of the side wall members on the head and the rails 120 closely engage the outer surfaces of the end wall members 30, thus firmly holding these members in assembled positions and relations on the head. When the head reaches its lowermost position the corner staying means described above are operated to apply a stay to each of the four corners of the box, thus connecting the side wall members to the end walls and bottom forming member to complete the box.

Upon completion of the staying operation the head moves upwardly and is withdrawn from the box, which is held at the staying location by the vertical rails 102, 120. The staying location is just above a moving conveyor belt (not shown) and when the head moves downwardly carrying the next box to the staying location in the next cycle of operation of the machine it forces the box downwardly beyond the ends of rails 102 and 120 from which it drops onto the conveyor belt.

Figure 16:
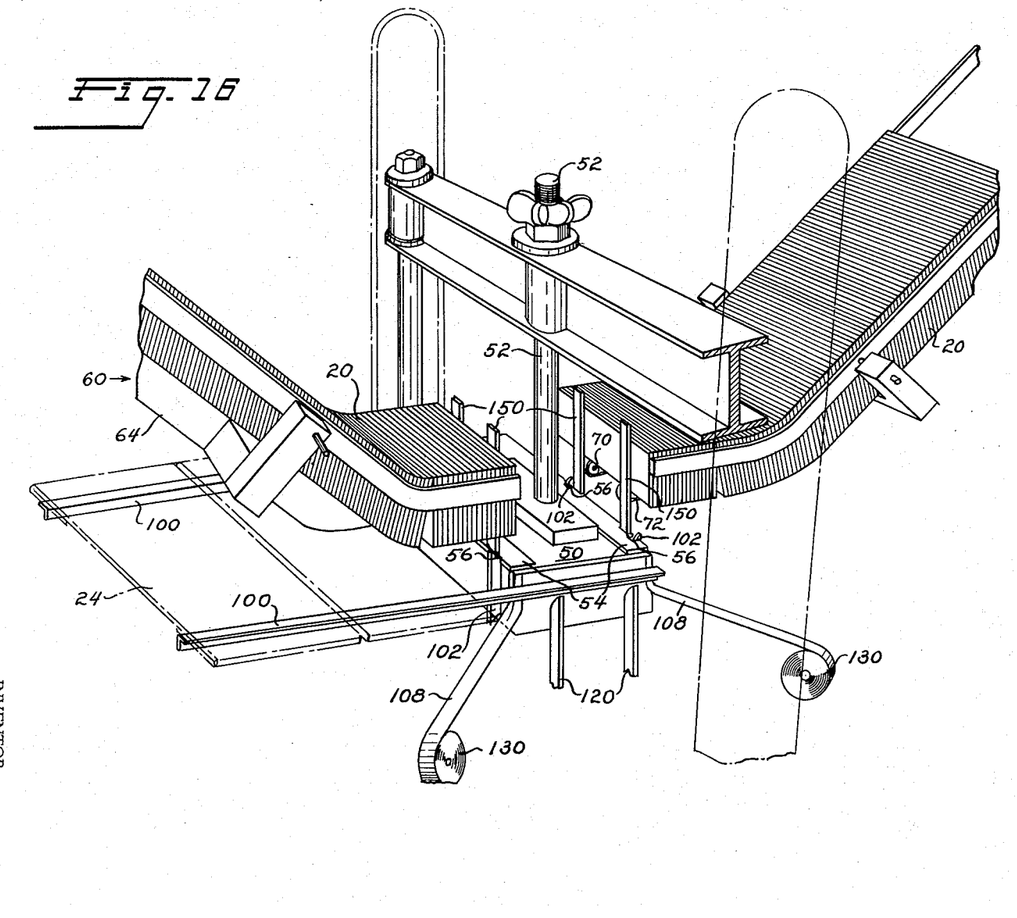
Fig. 16 is a perspective view of a second embodiment of the invention, including modified means for holding and releasing the side wall forming members.
Figure 17:
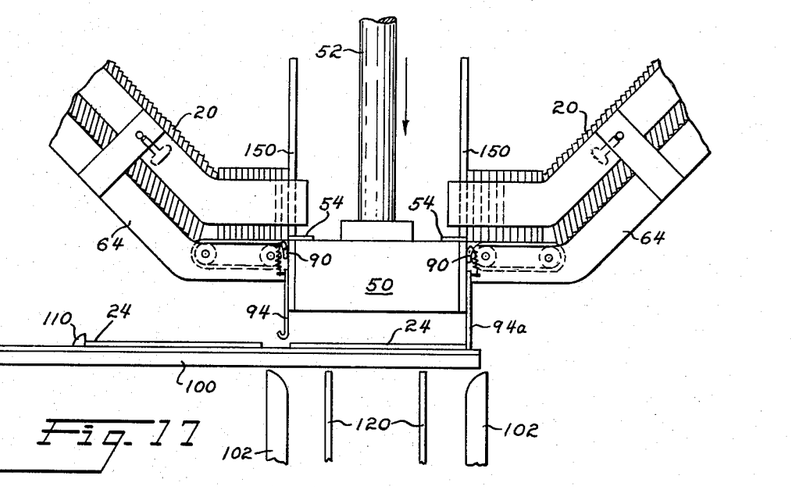
Figs. 17 and 18 are end views of the box making apparatus illustrated in Fig. 16, shown in successive stages of operation.
Figure 18:
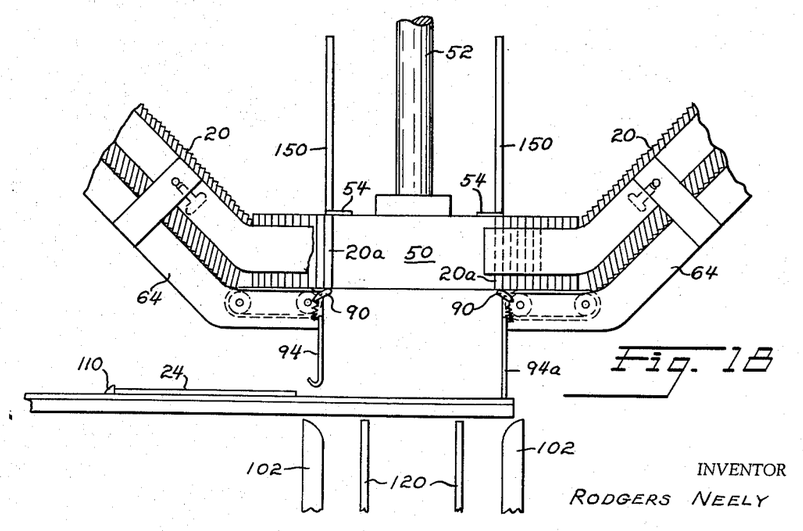

In Figs. 16, 17 and 18 of the drawings there is disclosed a modified form of box making machine according to the invention in which a preferred form of means is provided for holding the side wall forming members 20 in their two stacks adjacent the uppermost position of the head and for releasing them for movement into engagement with the side walls of the head when the head is in its uppermost position, as in the first described embodiment of the invention. In this preferred form of the invention the vertically slidable rods have been eliminated and, in their place and providing the same function, there are provided one or more rods or bars 150 which extend vertically upwardly from the upper surface of each of the metal strips 54 which are attached to the upper surface of the head 50 and extend along and above the side walls thereof. In the disclosed embodiment two of these rods are positioned at each side of the head and each of them is connected at its lower end to the strip by any suitable means such as welding, and each is so positioned that, as shown best in Figs. 17 and 18, its outer edge is vertically aligned with the outer edge of the strip 54 to which it is attached. Each rod 150 is of such length that when the head is in its lowermost position the upper part of the rod engages the outer face of the outermost side wall member 20a of the adjacent pile of side wall members, and each rod thus restrains the movement of the adjacent stack of side wall members toward the head under the influence and urging of the endless members 72 during the entire upward and downward movement of the head, except only that the rods 150 are removed from engagement with the outer surface of the adjacent outermost side wall member 20a when the head reaches its uppermost position in its upward travel, as shown in Fig. 18. In this latter position of the parts the two piles of side wall members 20 are freed to move toward the head and are so moved by the endless members 72 in the manner described above. The outermost side wall member 20a of each pile of side wall members is therefore moved into engagement with the adjacent side wall of the head when the head reaches its uppermost position, and is held there during the entire downward movement of the head by the means described hereinbefore in connection with the first embodiment of the invention.

While I have described and illustrated two forms which my invention may take, it will be apparent to those skilled in the art that other embodiments, as well as modifications of those disclosed, may be made and practised without departing in any way from the spirit or scope of the invention, for the limits of which reference must be made to the appended claims.

What is claimed is:

1. A machine for manufacturing a box from a unitary blank having a single thickness bottom forming part and two double thickness end wall forming parts and separate, rigid side walls, comprising a head having a lower surface and end walls and side walls which correspond in shape and relation to each other to the inner surfaces of the bottom, end walls and side walls of the finished box, means for reciprocating said head to upper and lower positions in the box-making cycle of the machine, means operable at the uppermost position of the head to position a unitary blank having a single thickness bottom forming part and two double thickness end wall forming parts at a position between the upper and lower positions of the head, means operable at the upper position of the head to place one of said rigid side wall members in face-to-face abutting relation to each of the side walls of the head, means external to the head and fixed with respect thereto and extending substantially throughout the vertical travel of the head for engaging the outer surfaces of the side wall members which are in abutting relation to the head for holding said side wall members in engagement with the side walls of the head during downward movement of the head, means operable upon engagement of the lower surface of the head with the bottom forming part of the blank at the intermediate position of the head to cause the end wall forming parts of the blank to be folded about score lines into face-to-face abutting relation to the end walls of the head and into assembled relation to the side wall members on the head, and means at the lower position of the head for connecting the members of the box which are assembled on the head to form a unitary structure.

2. A machine for manufacturing a box from a unitary blank having a single thickness bottom forming part and two double thickness end wall forming parts and separate, rigid side walls, comprising a head having a lower surface and end walls and side walls which correspond in size and relation to the inner surfaces of the bottom, end walls and side walls of the finished box, means for reciprocating said head to upper and lower positions in the box-making cycle of the machine, means operable during upward movement of the head adjacent its upper position to position a unitary blank having a single thickness bottom forming part and two double thickness end wall forming parts at a position below the upper position of the head, means at each side of the head at the upper position thereof for supporting a plurality of rigid side wall members vertically positioned on their side edges and for constantly urging them toward the side walls of the head, means normally holding the side wall members at each side of the head from movement into engagement with the head, means operable upon movement of the head to its upper position to move said normally holding means away from the side members at each side of the head to permit said constantly urging means to move the side wall members at each side of the head toward and into engagement with the side walls of the head, means external to the head for holding said side wall members in engagement with the side walls of the head during downward movement of the head, means operable during downward movement of the head and upon engagement of the lower surface of the head with the bottom forming part of the blank positioned below the upper position of the head to fold the end wall forming parts of the blank into face-to-face abutting relation with the end walls of the head and into assembled relation to the side wall members on the head, and means at the lower position of the head for connecting the members of the box to form a unitary structure.

3. A machine for manufacturing a box from a unitary blank having a single thickness bottom forming part and two double thickness end wall forming parts and separate, rigid side walls, comprising a head having a lower surface and end walls and side walls corresponding in size and relation to the inner surfaces of the bottom, end walls and side walls of the finished box, means for reciprocating said head to upper and lower positions in the box-making cycle of the machine, means operable during upward movement of the head adjacent its upper position to position a unitary blank having a single thickness bottom forming part and two double thickness end wall forming parts at a position below the upper position of the head, means at the upper position of the head and at each side thereof for supporting a plurality of side wall members horizontally stacked on their side edges, means for constantly urging said stacked side wall members toward the head, each of said urging means comprising an endless belt having an upper reach on which the side wall members are stacked on their side edges whereby they are substantially parallel to the side walls of the head, means positioned when the head is below its upper position to restrain movement of a side wall member from either stack toward the head and being movable out of such restraining position by movement of the head to its upper position to permit movement of a side wall member from each stack into face-to-face abutting engagement with each side wall of the head, means for holding a side wall member in face-to-face abutting engagement with each side wall of the head during downward movement of the head, means operable upon engagement of the lower surface of the head with the bottom forming part of the blank during downward movement of the head to fold the end wall forming parts of the blank into face-to-face abutting relation to the end walls of the head and into assembled relation to the side wall members on the head, and means at the lower position of the head for connecting the members of the box to form a unitary structure.

4. A machine for manufacturing a box having a unitary bottom and end walls and separate, rigid side walls, comprising a head having a lower surface and end walls and side walls corresponding in size and relation to the inner surfaces of the bottom, end walls and side walls of the finished box, means extending outwardly from the upper edge of each side wall of the head a distance approximately equal to the thickness of a side wall of the box, means for reciprocating the head to upper and lower positions in the box-making cycle of the machine, means operable during upward movement of the head adjacent its upper position to position a bottom and end walls forming blank at a position below the upper position of the head, means at the level of the upper position of the head for supporting a plurality of horizontally stacked side wall members at each side of the head and constantly urging said side wall members toward the head, each of said supporting and urging means comprising an endless member having an upper reach on which the side wall members are supported on their side edges whereby they are substantially parallel to the side walls of the head, at least one vertically slidable rod positioned at the end of each stack of side wall members adjacent the head and normally preventing movement thereof by said constantly urging means, said rods being positioned above and in the line of movement of the means which extend outwardly from each side wall of the head whereby they are moved upwardly and away from their respective stacks upon movement of the head to its upper position to thereby permit said constantly urging means to move the outermost side wall member of each stack into face-to-face abutting relation to the adjacent side wall of the head, means external to the head for holding a side wall member in face-to-face abutting engagement with each side wall of the head during downward movement of the head, means operable upon engagement of the lower surface of the head with the bottom forming part of the blank during downward movement of the head to fold the end wall forming parts of the blank into face-to-face abutting relation to the end walls of the head and into assembled relation to the side wall members on the head, and means at the lower position of the head for connecting the members of the box to form a unitary structure.

5. A machine according to claim 4 comprising, in addition, resilient means constantly urging each of said rods to its lower position at the end of the adjacent stack of side wall members.

6. A machine for manufacturing a box from a unitary blank having a single thickness bottom forming part and two double thickness end wall forming parts and separate, rigid side walls, comprising a head having a lower surface and end walls and side walls corresponding in size and relation to the inner surfaces of the bottom, end walls and side walls of the finished box, means for reciprocating said head to upper and lower positions in the box-making cycle of the machine, means operable during upward movement of the head adjacent its upper position to position a unitary blank having a single thickness bottom forming part and two double thickness end wall forming parts at a position below the upper position of the head, means at the level of the upper position of the head for supporting a plurality of horizontally stacked side wall members at each side of the head in positions parallel to the side walls of the head and for constantly urging the side wall members of each stack toward the head, each of said supporting and urging means comprising an endless belt having upper reaches on which the side wall members are adapted to be stacked, means for supporting and moving each belt to cause the upper reach to move toward the head, an upwardly inclined track positioned adjacent and aligned with each of the upper reaches of said endless belts and providing therewith the supporting means for the stacked side wall members, means positioned when the head is below its upper position to restrain movement of a side wall member from either stack toward the head and being movable out of such restraining position by movement of the head to its upper position to permit movement of a side wall member from each stack into face-to-face abutting engagement with each side wall of the head, means for holding a side wall member in face-to-face abutting engagement with each side wall of the head during downward movement of the head from its upper position, means operable upon engagement of the lower surface of the head with the bottom forming part of the aforesaid positioned blank to cause the end wall forming parts of the blank to be folded into face-to-face abutting relation to the end walls of the head and into assembled relation to the side wall members on the head, and means at the lower position of the head for connecting the members of the box to form a unitary structure.

7. A machine according to claim 6, in which the means for holding a side wall member in face-to-face abutting engagement with each side wall of the head comprises at least one lever pivotally mounted on the machine below each of the horizontally stacked piles of side wall members and having one arm thereof disposed in the path of movement of the side wall member held on the head during initial downward movement thereof, and means resiliently urging said one arm of the lever upwardly.

8. A machine according to claim 7, in which the head is provided at the upper edge of each of its side walls with an outwardly extending part having recesses formed therein which are respectively vertically aligned with the ends of said levers whereby the head may pass the levers on upward movement of the head.

9. A machine according to claim 6, in which the means for holding each side wall member in face-to-face abutting engagement with a side wall of the head during vertical downward travel of the head comprises at least one vertical rail which is fixed with respect to the head and extends substantially throughout the vertical travel of the head and which is positioned to engage the outer surface of the side wall member which is in abutting relation to the head.

10. A machine according to claim 6, in which the means for holding each side wall member in face-to-face abutting engagement with a side wall of the head during vertical downward travel of the head comprises at least two vertically spaced vertical rails which are fixed with respect to the head and which together extend substantially throughout the vertical travel of the head and which have inner surfaces lying in the same plane which is spaced from the vertical plane of movement of the adjacent side wall of the head by a distance substantially equal to the thickness of a side wall member.

11. A machine according to claim 6, in which the means for holding a side wall member in face-to-face abutting engagement with each side wall of the head comprises at least one lever pivotally mounted on the machine below each of the horizontally stacked piles of side wall members and having one arm thereof disposed in the path of movement of the side wall member held on the head during initial downward movement thereof, means resiliently urging said one arm of each lever upwardly, a rail disposed on each side of the head below the lever mounted on such side, each of said rails having an inner surface spaced from the plane of vertical movement of the adjacent side wall of the head by a distance approximately equal to the thickness of a side wall.

12. A machine according to claim 6, in which the means for holding a side wall member in face-to-face abutting engagement with each side wall of the head comprises at least one lever pivotally mounted on the machine below each of the horizontally stacked piles of side wall members and having one arm thereof disposed in the path of movement of the side wall member held on the head during initial downward movement thereof, means resiliently urging said one arm of each lever upwardly, at least two vertically spaced rails disposed at each side of the head one of which is positioned at the lowermost position of the head, the rails on each side of the head having inner surfaces lying in a common plane which is spaced from the plane of vertical movement of the adjacent side wall of the head by a distance approximately equal to the thickness of a side wall member.

13. A machine according to claim 1, in which the means for causing the end wall forming parts of the blank to be folded into face-to-face abutting relation to the end walls of the head comprises two parallel rails extending substantially parallel to the end walls of the head at a position between the upper and lower positions of the head and which are equidistantly spaced outwardly from the adjacent end walls of the head each by a distance approximately equal to twice the thickness of the blank.

14. A machine for manufacturing a box having a bottom, end walls and side walls, comprising a head having two side walls, two end walls and a lower surface corresponding in size and relation to the inner surfaces of the side and end walls and bottom of the finished box, means extending outwardly from the upper edge of each side wall of the head a distance approximately equal to the thickness of a side wall of the box, means for reciprocating the head to upper and lower positions, at least two sprockets positioned in horizontal alignment on each side of the head adjacent the upper position thereof, an endless member trained over each pair of sprockets and the sprockets being so arranged and positioned that the upper reach of each endless member is moved toward the head when the sprockets are rotated, means for rotating the sprockets, means positioned adjacent and above the upper reach of each endless member to guide and hold a plurality of side wall members supported on their edges on such upper reach whereby such side wall members are constantly urged toward the head by the upper reaches of the endless members, means positioned above the head and at each side thereof and in the path of movement of the means which extend outwardly from the side walls of the head and each of which is adjacent the inner end of the upper reach of one of said endless members and is normally in a lower position to engage the side wall members on one of said upper reaches to prevent movement of such side wall members toward the head by said upper reaches, said last named means being movable by the means which extend outwardly from the side walls of the head on movement thereof to its upper position to a position out of engagement with the side wall members on the said upper reaches to permit the side wall members to be moved by the upper reaches to positions in face-to-face engagement with the side walls of the head, means operable when the head is in or adjacent its upper position to move into position below the head a generally flat blank formed of cardboard or the like and comprising a central bottom-forming part having substantially the same dimensions as the lower face of the head and being positioned in the line of movement thereof and an end wall forming part at each end of the bottom-forming part and connected thereto by a score line, means engaging only the end wall forming parts of the blank to support the blank in such position whereby the end wall forming parts of the blank are restrained from downward movement when the bottom forming part of the blank is engaged and moved downwardly on downward movement of the head whereby the end wall forming parts of the blank are folded upwardly about the said score lines into set-up relation to the bottom forming part of the blank and into box-forming relation to the side wall parts on the head, means for moving the head further downwardly, and means operable at the end of the downward movement of the head to apply adhesive corner stays to the end and side walls of the box.

15. A machine for manufacturing a box from a unitary blank having a single thickness bottom forming part and two double thickness end wall forming parts and separate rigid side walls, comprising a head having a lower surface and end walls and side walls corresponding in size and relation to the inner surfaces of the bottom, end walls and side walls of the finished box, means for reciprocating said head to upper and lower positions in the box-making cycle of the machine, means operable during upward movement of the head to position a unitary blank having a single thickness bottom forming part and two double thickness end wall forming parts below the head, a track extending outwardly horizontally and then angularly upwardly from each side wall side of the head for receiving stacked side wall members resting on their edges, the horizontal part of each track having an upper surface substantially level with the lower surface of the head when the head is in its upper position, means operable when the head reaches its upper position to move one side wall member from each horizontal track part into face-to-face abutting position on the adjacent side wall of the head, means external to the head and fixed with respect thereto and extending substantially throughout the vertical travel of the head for engaging the outer surfaces of the side wall members which are in abutting relation to the head for holding said side wall members in position on the head during downward movement of the head, means operable upon engagement of the lower surface of the head with the bottom forming part of the blank positioned below the head to fold the end wall forming parts of the blank into face-to-face abutting relation to the end walls of the head and into assembled relation to the side wall members on the head, and means at the lower position of the head for connecting the end and side wall members of the box to form a unitary structure.

16. A machine for manufacturing a box having a bottom, end walls and side walls, comprising a head having two side walls, two end walls and a lower surface corresponding in size and relation to the inner surfaces of the side and end walls and bottom of the finished box, means extending outwardly from the upper edge of each side wall of the head a distance approximately equal to the thickness of a side wall of the box, means for reciprocating the head to upper and lower positions, at least two sprockets positioned in horizontal alignment on each side of the head adjacent the upper position thereof, an endless member trained over each pair of sprockets and the sprockets being so arranged and positioned that the upper reach of each endless member is moved toward the head when the sprockets are rotated, means for rotating the sprockets, means positioned adjacent and above the upper reach of each endless member to guide and hold a plurality of side wall members supported on their edges on such upper reach whereby such side wall members are constantly urged toward the head by the upper reaches of the endless members, means positioned above the head and at each side thereof and extending vertically upwardly from the means which extend outwardly from the side walls of the head and each of which is adjacent the inner end of the upper reach of one of said endless members and is normally in a position to engage the side wall members on one of said upper reaches to prevent movement of such side wall members toward the head by said upper reaches, said last named means being movable with the head on movement thereof to its upper position to a position out of engagement with the side wall members on the said upper reaches to permit the side wall members to be moved by the upper reaches to positions in face-to-face engagement with the side walls of the head, means operable when the head is in or adjacent its upper position to move into position below the head a generally flat blank formed of cardboard or the like and comprising a central bottom-forming part having substantially the same dimensions as the lower face of the head and being positioned in the line of movement thereof and an end wall forming part at each end of the bottom-forming part and connected thereto by a score line, means engaging only the end wall forming parts of the blank to support the blank in such position whereby the end wall forming parts of the blank are restrained from downward movement when the bottom forming part of the blank is engaged and moved downwardly on downward movement of the head whereby the end wall forming parts of the blank are folded upwardly about said score lines into set-up relation to the bottom forming part of the blank and into box-forming relation to the side wall parts on the head, means for moving the head further downwardly, and means operable at the end of downward movement of the head to apply adhesive corner stays to the end and side walls of the box.

17. A machine for manufacturing a box having a unitary bottom and end walls and separate, rigid side walls, comprising a head having a lower surface and end walls and side walls corresponding in size and relation to the inner surfaces of the bottom, end walls and side walls of the finished box, means extending outwardly from the upper edge of each side wall of the head a distance approximately equal to the thickness of a side wall of the box, means for reciprocating the head to upper and lower positions in the box-making cycle of the machine, means operable during upward movement of the head adjacent its upper position to position a bottom and end wells forming blank at a position below the upper position of the head, means at the level of the upper position of the head for supporting a plurality of horizontally stacked side wall members at each side of the head and constantly urging said side wall members toward the head, each of said supporting and urging means comprising an endless member having an upper reach on which the side wall members are supported on their side edges whereby they are substantially parallel to the side walls of the head, at least one vertical rod extending upwardly from the head at each side thereof and movable with the head and positioned to engage the outer surface of the outermost side wall member of each stack of side wall members to normally prevent movement thereof toward the head by said constantly urging means but permitting said constantly urging means to move the outermost side wall member of each stack into face-to-face abutting relation to the adjacent side wall of the head when the head is in its uppermost position, means external to the head for holding a side wall member in face-to-face abutting engagement with each side wall of the head during downward movement of the head, means operable upon engagement of the lower surface of the head with the bottom forming part of the blank during downward movement of the head to fold the end wall forming parts of the blank into face-to-face abutting relation to the end walls of the head and into assembled relation to the side wall members on the head, and means at the lower position of the head for connecting the members of the box to form a unitary structure.

References Cited in the file of this patent

UNITED STATES PATENTS

| | | |
|---|---|---|
| 1,715,585 | Woodworth | June 4, 1929 |
| 2,270,212 | Chaffin | Jan. 13, 1942 |
| 2,392,746 | LaBombarde | Jan. 8, 1946 |